2,746,926

SILOXANE-SILICATE COMPOSITIONS

Arthur J. Barry, Midland, Mich., assignor to Dow Corning Corporation, Midland, Mich., a corporation of Michigan No Drawing. Application June 19, 1953,
Serial No. 362,968

1 Claim. (Cl. 252—78)

This invention relates to combinations of organosilicates and organosiloxanes.

It is known that alkyl silicates have many of the desirable properties needed for a satisfactory hydraulic fluid, such as the necessary lubricity, thermal stability at both high and low temperatures, hydrolytic stability and temperature-viscosity-volatility relationship. However, they are undesirable per se because of their low viscosity. In order for the materials to be workable, it is necessary to thicken them to a satisfactory consistency. Organic thickening agents are not applicable because of their thermal instability. Various siloxanes have been tried but these, for one reason or another, have not proved to be satisfactory. For example, dimethylpolysiloxane fluids are not acceptable because they phase out of the silicates at low temperatures. Diethylpolysiloxane fluids phase out at low temperatures and also are unstable at elevated temperatures. Phenylmethylpolysiloxanes show satisfactory compatibility at all temperatures but will gel when mixed with the silicates and heated at elevated temperatures. This is most unexpected, for it is known that phenylmethylpolysiloxanes per se are far superior in thermal stability to alkylpolysiloxanes. It has been found most unexpectedly that all the difficulties encountered with the above polysiloxanes can be eliminated by employing ethylmethylpolysiloxane fluids.

It is the object of this invention to prepare compositions of matter of improved thermal stability which are satisfactory for use in hydraulic systems.

This invention relates to compositions of matter comprising from 1 to 30 per cent by weight of an ethylmethylsiloxane fluid of at least 100 cs. viscosity at 25° C. and from 70 to 99 per cent by weight of a tetraalkoxysilicate of the formula Si(OR)₄, in which R is an alkyl radical of from 2 to 10 carbon atoms and in which silicate there is an average of from 12 to 40 carbon atoms per silicon atom.

The ethylmethylsiloxane fluids employed in this invention range in viscosity from relatively thin liquids up to practically non-flowing silicate-soluble materials. For the purpose of this invention, these fluids can be homopolymers of the formula CH₃(C₂H₅)SiO or they can be copolymers of the formula

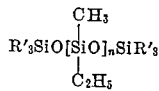

where R' is ethyl, methyl or phenyl or the fluids can be mixtures of these two types of polymers. It is preferable that no more than one R' group on each silicon atom be phenyl.

The silicates which are within the scope of this invention are tetraalkoxysilicates in which the alkyl radical ranges from ethyl to decyl inclusive. In all cases, however, the silicates must have an average of at least 12 carbon atoms per silicon atom and an average of not more than 40 carbon atoms per silicon atom. The silicate may be either a pure species or it may be a mixture of various species. Thus, the silicate may be one in which all of the OR groups are the same such as, for example, tetra-2-octylsilicate or the silicate may be a mixture of two or more species in each of which the OR groups are the same such as, for example, a mixture of tetra-2-octylsilicate and tetra-2-heptylsilicate, or the silicate may be a mixture of materials having various OR groups attached to each silicon, for example a mixture of diethyldioctylsilicate and propylethyldioctylsilicate or the silicate may be a pure species having different OR groups attached to the silicon such as ethylbutyldidecylsilicate.

Specific examples of silicates and mixed silicates which are operative herein are tetra(3-pentyl)silicate, tetra(2-methyl-1-butyl)silicate, tetra(2-methyl-2-butyl)silicate, tetra(4-methyl-2-pentyl)silicate, tetra(2-ethyl-1-butyl)silicate, tetra(2-heptyl)silicate, tetra(2-octyl)silicate, tetra(2-ethyl-1-hexyl)silicate, isopropyltri(4-methyl-2-pentyl)silicate, diethyldi(2-methyl-2-butyl)silicate, ethyl(2-methyl-2-butyl)di(4-methyl-2-pentyl)silicate and mixtures of tetra(2-propyl)silicate and tetra(4-methyl-2-pentyl)silicate; tetraethylsilicate, tetra(2-methyl-2-butyl)silicate and tetra(4-methyl-2-pentyl) silicate; and combinations of any of the above.

The silicates employed in this invention may be prepared by any of the conventional methods for preparing such materials. The most frequently employed methods are the reaction of the corresponding alcohols with silicon tetrachloride and the reaction of the corresponding alcohols with lower alkylsilicates such as tetramethylsilicate or tetraethylsilicate. In the latter process ester interchange takes place and the reaction is carried out at a temperature above the boiling point of the lower alcohol derived from the lower alkylsilicate. For the purpose of this invention, it is not necessary to separate the individual species from the reaction mixture prior to use. For example, mixed silicates may be prepared by adding a mixture of ethanol, 2-methylbutanol and 4-methylpentanol to silicon tetrachloride and thereafter removing the HCl.

The compositions of this invention are prepared by merely mixing the ethylmethylsiloxane and the silicate. If desired, antioxidants such as phenyl-α-naphthylamines or naphthiazines may be employed to increase the life of the fluid. Other additives such as corrosion inhibitors and the like may also be employed.

The following example is illustrative only and should not be constructed as limiting the invention which is properly delineated in the appended claim.

Example

A mixture comprising 10 per cent by weight of a 40,000 cs. ethylmethylpolysiloxane fluid and 90 per cent by weight of a mixture of silicates comprising one part by weight tetra(2-ethylbutyl)silicate and three parts by weight tetra(2-ethylhexyl)silicate was prepared and was found to have the following properties:

It did not separate when maintained at —65° C. for 72 hours.

It remained fluid after being heated at 400° F. for 24 hours as air was bubbled through.

This material is satisfactory for use as a hydraulic fluid.

By contrast, a mixture of 90 per cent by weight of the above silicate composition and 10 per cent by weight of a 30,000 cs. dimethylpolysiloxane fluid separated into two phases when cooled to —65° C.

A mixture of 90 per cent by weight of the above silicate composition and 10 per cent by weight of a 30,000 cs. methylphenylpolysiloxane fluid gelled when air was bubbled therethrough under identical conditions as those employed with the ethylmethylpolysiloxane-silicate composition.

That which is claimed is:

A composition of matter consisting essentially of from 1 to 30 per cent by weight of an ethylmethylpolysiloxane fluid having a viscosity of at least 100 cs. at 25° C. said ethylmethylpolysiloxane fluid being of a formula selected from the group consisting of $CH_3(C_2H_5)SiO$ and

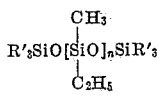

where R′ is selected from the group consisting of ethyl, methyl and phenyl radicals and from 70 to 99 per cent by weight of an alkoxysilicate of the formula $Si(OR)_4$ in which R is an alkyl radical of from 2 to 10 carbon atoms and in which silicate there is an average of from 12 to 40 inclusive carbon atoms per silicon atom.

References Cited in the file of this patent

UNITED STATES PATENTS

| | | |
|---|---|---|
| 2,413,513 | Morill | Dec. 31, 1946 |
| 2,495,362 | Barry | Jan. 24, 1950 |
| 2,495,363 | Barry et al. | Jan. 24, 1950 |
| 2,643,263 | Morgan et al. | June 23, 1953 |